UNITED STATES PATENT OFFICE.

JOSEPH HOFFMAN, OF SCHENECTADY, NEW YORK, ASSIGNOR TO THE GENERAL ELECTRIC COMPANY, OF NEW YORK.

INSULATING COMPOUND AND METHOD OF MANUFACTURING THE SAME.

SPECIFICATION forming part of Letters Patent No. 505,916, dated October 3, 1893.

Application filed December 2, 1892. Serial No. 453,869. (No specimens.)

*To all whom it may concern:*

Be it known that I, JOSEPH HOFFMAN, a citizen of the United States, residing at Schenectady, county of Schenectady, State of New York, have invented a certain new and useful Improvement in Insulating Compounds and Methods of Manufacturing the Same, of which the following is a specification.

My invention relates to improvements in insulating material and the method of compounding and molding the same, the said material being substantially water-proof, fire-proof, hard, strong and durable.

The following description will disclose the different materials used and the successive steps of my process: I take about one hundred pounds of asbestus fiber and fifty pounds of powdered asbestus, which are thoroughly mixed together by means of any well known form of mixing machine. I also take about six pounds of bees-wax and twelve pounds of asphaltum dissolved in two and one half gallons of benzine. These materials are mixed together and are then sprinkled over the asbestus by means of an atomizer or similar spraying device. This process effects an intimate saturation of the asbestus with the asphaltum and bees-wax, whereas in other methods of mixing it has been practically impossible to secure a sufficiently close association between the fibers of the asbestus and liquid material with which asbestus fiber has been mingled because the tendency has been that each bunch of fiber strains out the lighter and more volatile parts of the liquid, leaving the heavier parts on the outside. It has also been necessary to use a much larger portion of liquid material than I employ. After the asbestus has been dried it is still in the form of a powder or meal having the longer fibers mingled therewith. I then take thirty pounds of shellac, preferably adding thereto three and one half pounds of albumen and about ten pounds of drop-black or other suitable material for coloring. This material is also in the form of a fine powder which is mixed with the asbestus meal above described. The whole mixture is then put into heated molds and subjected to great pressure and afterward cooled. The resulting molded material is hard, tough and substantially water-proof and fire-proof so that it may be used for an insulating material, or for other similar purposes for which a molded compound is desired.

I believe that the compound substantially above described is novel with me and that the method of mixing and molding, especially the molding from a mealy or powdered condition is new with me, and I desire to claim the same herein, although it is to be understood that I do not limit myself to the exact proportions above specified, it being understood that I use simply enough of the binding material to stick the asbestus fibers intimately together when heat and pressure are applied. It will be understood that the material will be more or less fire-proof according to the amount of asbestus used, while its water-proof qualities are insured by the bees-wax and asphaltum, and its strength and hardness by the shellac.

What I claim as new, and desire to secure by Letters Patent, is—

1. The compound substantially as herein described consisting of asbestus fiber with a binding material consisting of asphaltum, bees-wax and shellac.

2. The compound above described consisting of asbestus and a binding material composed of asphaltum and bees-wax and a hardening substance such as shellac and albumen with suitable coloring material.

3. The method of manufacturing the molded material herein described consisting of applying binding material to the asbestus by spraying it with a mixture of bees-wax and asphaltum with a suitable solvent then drying it and after mixing powdered shellac with the mealy substance thus formed molding the same under heat and pressure.

4. The method of manufacturing the molded material herein described which consists in mixing powdered asbestus with asbestus fiber, spraying the mixture with a solution of asphaltum and bees-wax, drying it to expel the solvent then mixing therewith powdered shellac and albumen and finally molding the mealy substance thus produced under heat and pressure.

In witness whereof I have hereto set my hand this 29th day of November, 1892.

JOSEPH HOFFMAN.

Witnesses:
H. J. LIVERMORE,
N. F. HAYES.